United States Patent
Fay, II

(10) Patent No.: US 12,075,717 B2
(45) Date of Patent: Sep. 3, 2024

(54) CENTER PIVOT MOWER WITH TURN COMPENSATION

(71) Applicant: CNH Industrial America LLC, New Holland, PA (US)

(72) Inventor: Jeffrey B. Fay, II, Oxford, PA (US)

(73) Assignee: CNH Industrial America LLC, Holland, PA (US)

( * ) Notice: Subject to any disclaimer, the term of this patent is extended or adjusted under 35 U.S.C. 154(b) by 481 days.

(21) Appl. No.: 17/335,791

(22) Filed: Jun. 1, 2021

(65) Prior Publication Data
US 2022/0377963 A1    Dec. 1, 2022

(51) Int. Cl.
*A01B 69/00* (2006.01)
*A01D 34/00* (2006.01)
(Continued)

(52) U.S. Cl.
CPC .......... *A01B 69/004* (2013.01); *A01D 34/006* (2013.01); *B60D 1/246* (2013.01);
(Continued)

(58) Field of Classification Search
CPC ... A01B 69/004; A01B 69/003; A01B 69/006; A01D 34/006; A01D 67/005;
(Continued)

(56) References Cited

U.S. PATENT DOCUMENTS

| | | | | |
|---|---|---|---|---|
| 5,558,350 A | * | 9/1996 | Kimbrough | B62D 13/04 280/426 |
| 6,804,597 B1 | * | 10/2004 | Posselius | A01B 79/005 701/50 |

(Continued)

FOREIGN PATENT DOCUMENTS

| | | | | |
|---|---|---|---|---|
| DE | 102019124310 A1 | * | 3/2021 | ........... A01B 69/004 |
| EP | 2 082 637 B1 | | 7/2011 | |

(Continued)

OTHER PUBLICATIONS

Extended European Search Report for EP Application No. 22175602.6 Dated Oct. 31, 2022 (five pages).

*Primary Examiner* — Abby Y Lin
*Assistant Examiner* — Karston G. Evans
(74) *Attorney, Agent, or Firm* — Peter K. Zacharias; Rebecca L. Henkel; Rickard K. DeMille

(57) ABSTRACT

An agricultural mower system includes: a towing vehicle including an engine and a tongue coupler and defining a towing centerline; a mower including a frame carrying cutters and pivotably coupled to a tongue that is pivotably coupled to the tongue coupler, the frame defining a mower centerline that is offset from the towing centerline, the tongue defining a towing angle with respect to the towing centerline and a mower angle with respect to the mower centerline; a mower angle actuator coupled to the tongue and the frame; and a controller configured to: determine the towing angle has changed by a change amount relative to a defined towing angle; determine a turn compensation amount for the mower angle as a function of the change amount and a constant; and output a compensation signal to cause the mower angle actuator to adjust the mower angle by the determined turn compensation amount.

20 Claims, 4 Drawing Sheets

(51) Int. Cl.
*B60D 1/24* (2006.01)
*A01B 69/08* (2006.01)
*A01D 67/00* (2006.01)
*G05D 3/12* (2006.01)

(52) U.S. Cl.
CPC ........... *A01B 69/003* (2013.01); *A01B 69/006* (2013.01); *A01D 67/005* (2013.01); *G05D 3/12* (2013.01)

(58) Field of Classification Search
CPC ........ A01D 34/667; B60D 1/246; G05D 3/12; G05D 2201/0201
See application file for complete search history.

(56) References Cited

U.S. PATENT DOCUMENTS

| 9,114,832 | B2* | 8/2015 | Wang | .................... | A01B 69/006 |
| 2008/0195268 | A1* | 8/2008 | Sapilewski | .......... | A01B 69/004 |
| | | | | | 701/23 |
| 2009/0326763 | A1* | 12/2009 | Rekow | ................. | A01B 69/008 |
| | | | | | 701/42 |
| 2012/0185138 | A1* | 7/2012 | Prickel | ................. | A01B 69/004 |
| | | | | | 701/50 |
| 2012/0240546 | A1* | 9/2012 | Kormann | ................ | A01F 15/08 |
| | | | | | 701/41 |
| 2013/0186657 | A1* | 7/2013 | Kormann | ............ | A01B 69/004 |
| | | | | | 172/278 |
| 2014/0083071 | A1 | 3/2014 | Fay, II | | |
| 2015/0342110 | A1 | 12/2015 | Peake et al. | | |
| 2018/0099660 | A1* | 4/2018 | Weigert | ................ | B60W 30/06 |
| 2018/0202804 | A1 | 7/2018 | Dumble et al. | | |
| 2021/0127551 | A1 | 5/2021 | Priepke et al. | | |

FOREIGN PATENT DOCUMENTS

| EP | 2710875 | A1 | 3/2014 |
| FR | 2 857 560 | B3 | 1/2005 |
| FR | 2 904 180 | A1 | 2/2008 |
| JP | 2001-301636 | A | 10/2001 |
| JP | 2007-191139 | A | 8/2007 |
| WO | 2015065174 | A1 | 5/2015 |

* cited by examiner

CENTER PIVOT MOWER WITH TURN COMPENSATION

FIELD OF THE INVENTION

The present invention pertains to agricultural vehicles and, more specifically, to agricultural mowers.

BACKGROUND OF THE INVENTION

Mowers and mower-conditioners are often employed to cut hay and/or other standing plants, such as grass, in a field. A typical mower system includes a towing vehicle, which may be a tractor or similar vehicle, that pulls a mower and/or mower-conditioner.

Many mower systems utilize so-called "offset" mowers or mower-conditioners where the mower or mower-conditioner is not carried directly behind the towing vehicle, i.e. a centerline of the mower or mower-conditioner is parallel but offset from a centerline of the towing vehicle. The mower or mower-conditioner is coupled to the towing vehicle by a pivotable tongue, which can pivot during turns. During turns, it can be difficult for a user to efficiently control the mower or mower-conditioner so there is as little underlap of uncut crop material or overlap of cut crop material as possible.

What is needed in the art is a way to efficiently control a mower or a mower-conditioner during a turn of the towing vehicle.

SUMMARY OF THE INVENTION

Exemplary embodiments disclosed herein provide an agricultural mower system with a controller that can determine a turn compensation amount for a mower angle as a function of a change amount of a towing angle and a constant and cause adjustment of the mower angle.

In some exemplary embodiments provided according to the present disclosure, an agricultural mower system includes: a towing vehicle including an engine and a tongue coupler, the towing vehicle defining a towing centerline; a mower including a frame carrying a plurality of cutters and pivotably coupled to a tongue that is pivotably coupled to the tongue coupler, the frame defining a mower centerline that is offset from the towing centerline, the tongue defining a towing angle with respect to the towing centerline and a mower angle with respect to the mower centerline; a mower angle actuator coupled to the tongue and the frame and configured to pivot the frame with respect to the tongue to adjust the mower angle; a towing sensor associated with the towing vehicle and configured to output a towing angle signal corresponding to the towing angle; a mower sensor associated with the frame and configured to output a mower angle signal corresponding to the mower angle; and a controller operably coupled to the towing sensor and the mower sensor. The controller is configured to: determine the towing angle has changed by a change amount relative to a defined towing angle; determine a turn compensation amount for the mower angle as a function of the change amount and a constant; and output a compensation signal to cause the mower angle actuator to adjust the mower angle by the determined turn compensation amount.

In some embodiments, a method of adjusting a mower of an agricultural mower system is provided. The mower having a frame that is pivotably coupled to a tongue pivotably coupled to a tongue coupler of a towing vehicle. The towing vehicle includes an engine and defines a towing centerline. The mower includes a plurality of cutters carried by the frame, the frame defining a mower centerline that is offset from the towing centerline, the tongue defining a towing angle with respect to the towing centerline and a mower angle with respect to the mower centerline. The method includes: determining the towing angle has changed by a change amount relative to a defined towing angle; determining a turn compensation amount for the mower angle as a function of the change amount and a constant; and adjusting the mower angle by the determined turn compensation amount using a mower angle actuator coupled to the tongue and the mower.

One possible advantage that may be realized by exemplary embodiments disclosed herein is that the controller can cause adjustment of the mower angle so the mower continues to cut crop material to an edge of the uncut crop material during a turn.

Another possible advantage that may be realized by exemplary embodiments disclosed herein is that the system is self-contained and does not need data from other sources, such as a global positioning satellite.

Another possible advantage that may be realized by exemplary embodiments disclosed herein is that user fatigue may be reduced by reducing the need for a user to anticipate how to make adjustments during a turn so the mower cuts efficiently during the turn.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
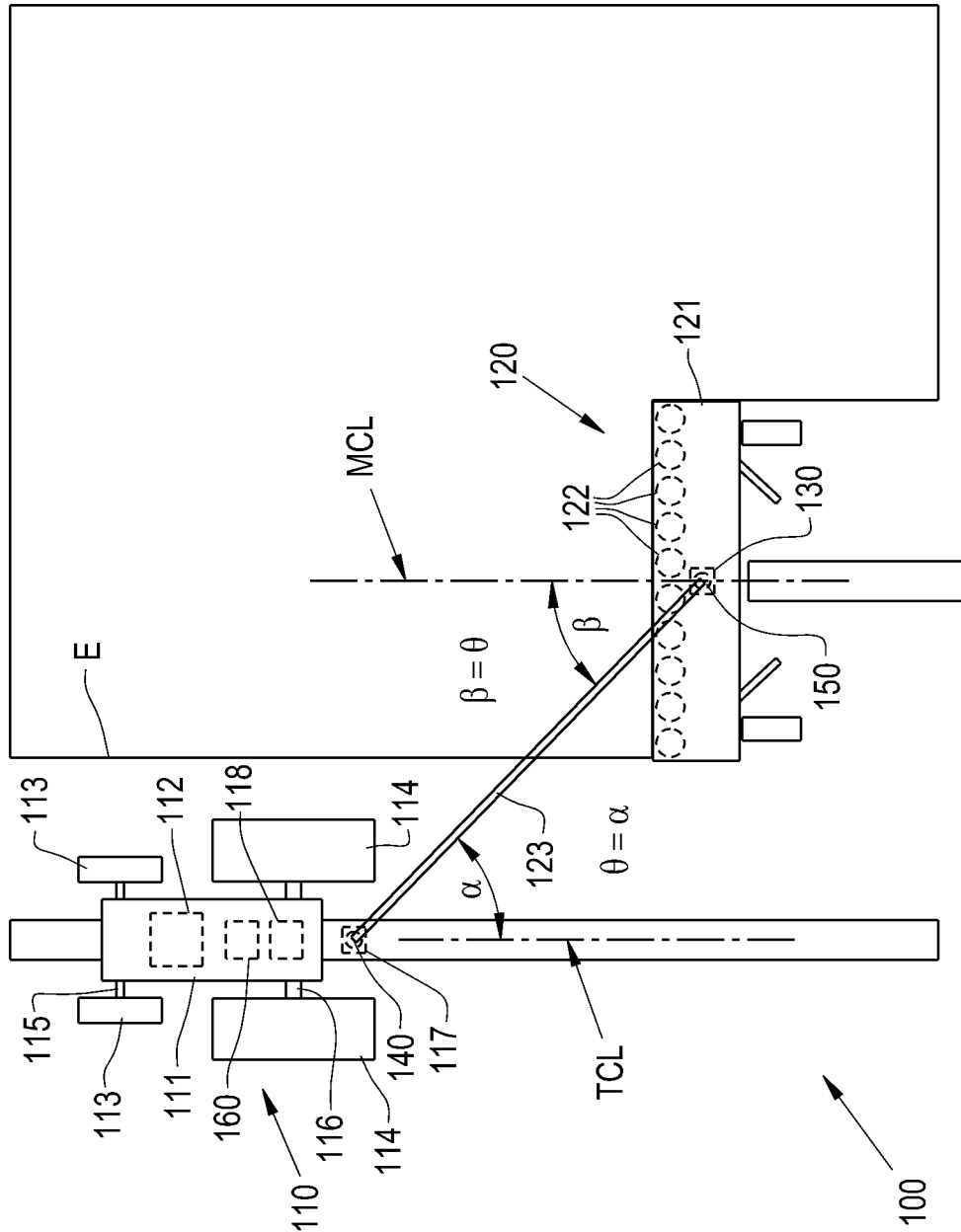
FIG. 1 illustrates a top view of an exemplary embodiment of an agricultural mower system provided according to the present disclosure while a towing vehicle and a mower of the system have centerlines that are in parallel with one another.

Referring now to the drawings, and more particularly to FIG. 1, an exemplary embodiment of an agricultural mower system 100 including a towing vehicle 110 and a mower 120 is illustrated. The towing vehicle 110 includes a chassis 111 and an engine, such as an internal combustion engine (ICE) 112, to provide motive force to a plurality of wheels 113, 114. Some of the wheels, such as front wheels 113, may be coupled to the chassis 111 by a steerable front axle 115 while the rear wheels 114 are coupled to the chassis 111 by a fixed rear axle 116. It should be appreciated that, alternatively, the front axle 115 may be a fixed axle and/or the rear axle 116 may be a steerable axle. The towing vehicle 110 includes a tongue coupler 117 to which a tongue is pivotably coupled, as will be described further herein. The towing vehicle 110 defines a towing centerline TCL. As illustrated, the towing vehicle 110 is in the form of a tractor, but it should be appreciated that the towing vehicle 110 may be other types of vehicles.

The mower 120 includes a frame 121 carrying a plurality of cutters 122 that is pivotably coupled to a tongue 123 that is pivotably coupled to the tongue coupler 117 of the towing vehicle 110. In this respect, the tongue 123 pivotably couples the frame 121 to the towing vehicle 110 while also being pivotable with respect to the frame 121, as will be described further herein. The frame 121 defines a mower centerline MCL that is offset from the towing centerline TCL, as illustrated, so the mower centerline MCL is not coaxial with the towing centerline TCL. The tongue 123 defines a towing angle $\theta$ with respect to the towing centerline TCL and a mower angle $\beta$ with respect to the mower centerline MCL, as illustrated. It should be appreciated that while the term "mower" is used to refer to the element 120, the term "mower" 120 also encompasses what is commonly referred to as a "mower-conditioner," which includes a conditioning mechanism, e.g., a flail conditioner or a pair of conditioning rolls, to condition cut crop material.

A mower angle actuator 130 is coupled to the tongue 123 and to the frame 121 and configured to pivot the frame 121 with respect to the tongue 123 to adjust the mower angle $\beta$. The mower angle actuator 130 may be, for example, a hydraulic cylinder, an electric actuator, a pneumatic actuator, etc. A towing sensor 140 is associated with the towing vehicle 110 and configured to output a towing angle signal corresponding to the towing angle $\theta$ and a mower sensor 150 is associated with the frame 121 and configured to output a mower angle signal corresponding to the mower angle $\beta$. Each of the sensors 140, 150 may be configured to determine the respective angle $\theta$, $\beta$ in a variety of ways, e.g., the sensors 140, 150 may be rotary potentiometers associated with their respective elements.

Figure 2:
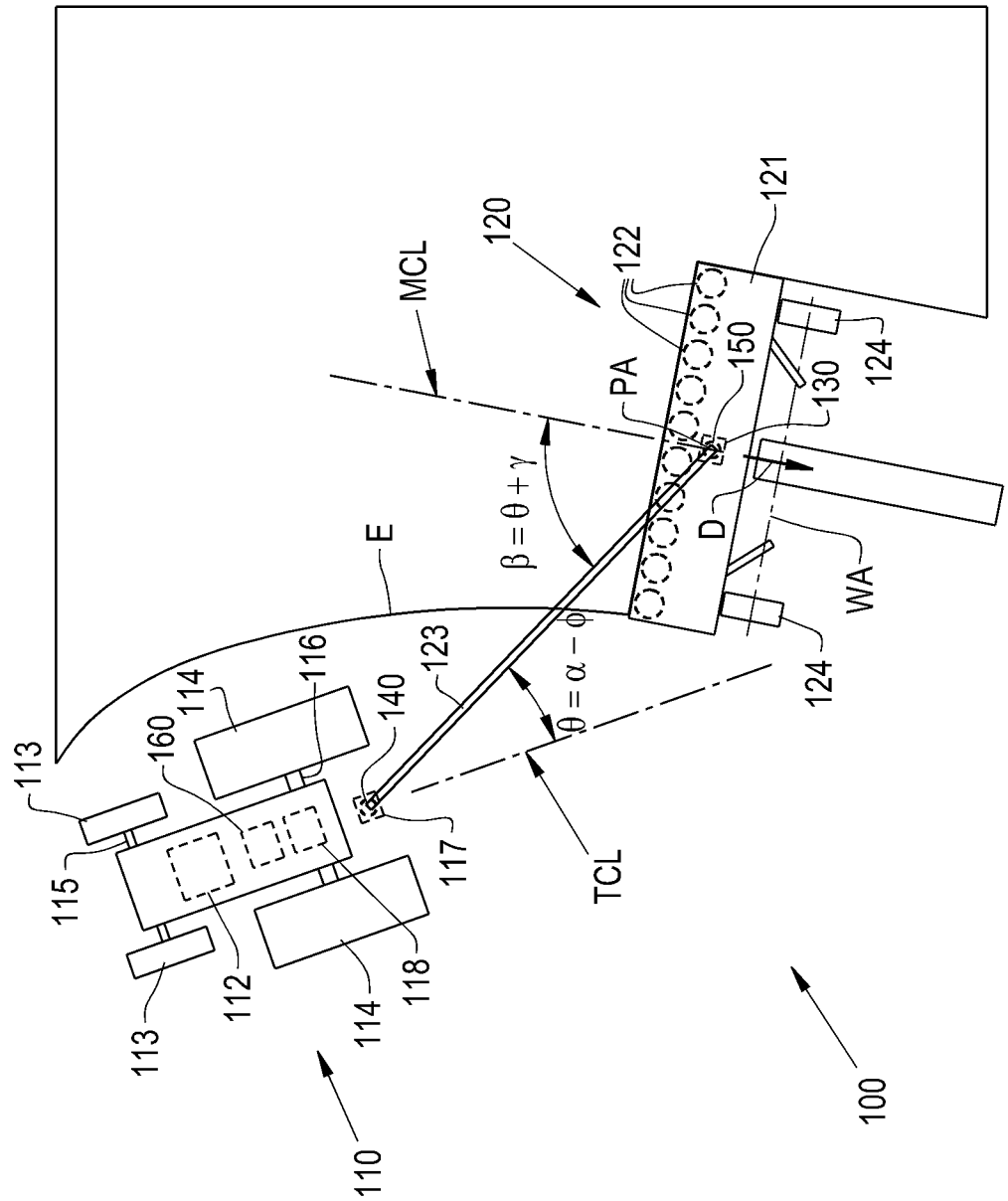
FIG. 2 illustrates a top view of the agricultural mower system of FIG. 1 when the towing vehicle is turning opposite an offset of the mower.
Figure 3:
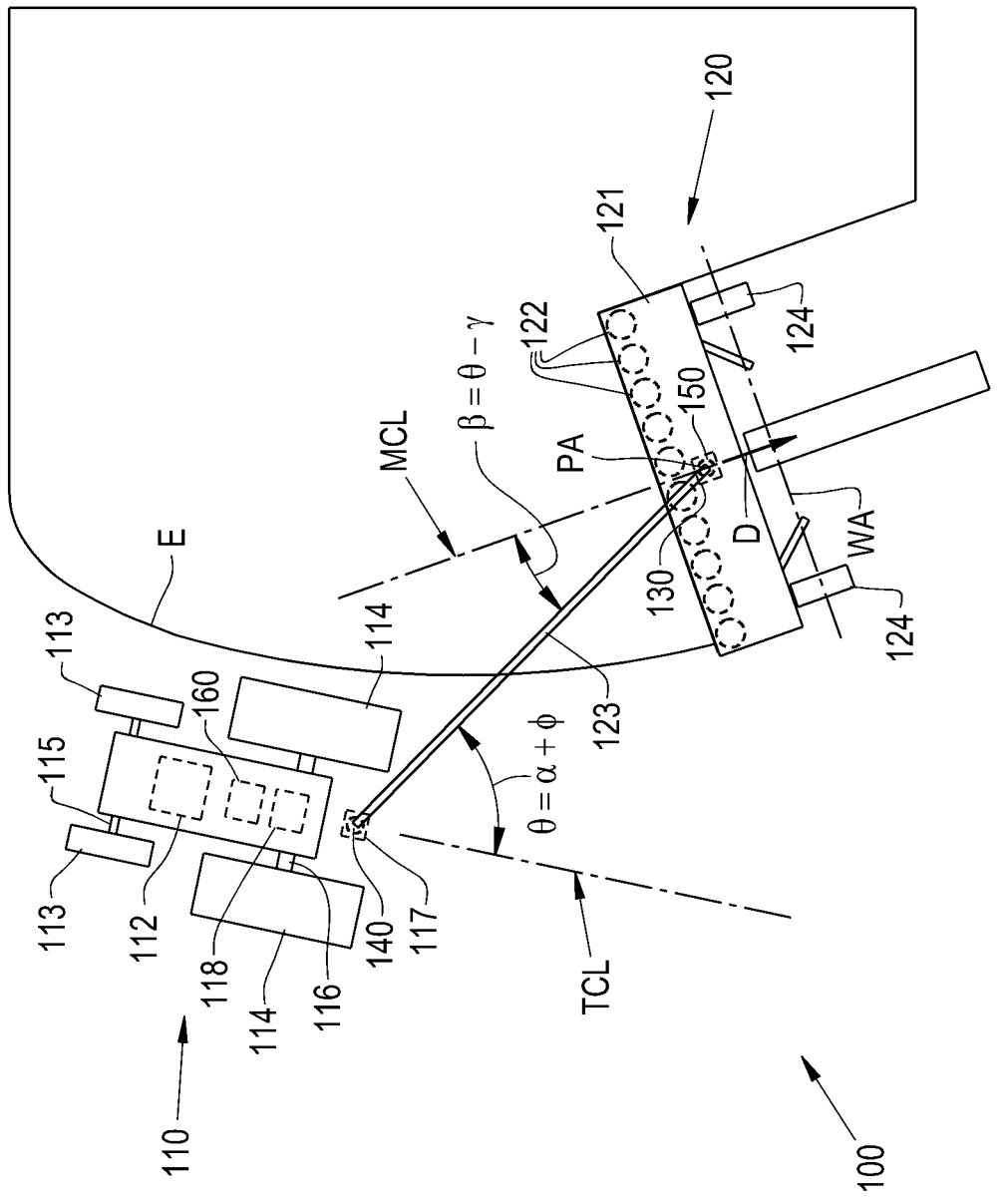
FIG. 3 illustrates a top view of the agricultural mower system of FIGS. 1-2 when the towing vehicle is turning in a same direction as the offset of the mower.

As illustrated in FIG. 1, the towing vehicle 110 and the mower 120 are traveling in a straight line path so the towing centerline TCL and the mower centerline MCL are parallel with one another. The relative orientation of the towing vehicle 110 and the mower 120 illustrated in FIG. 1 corresponds to a "normal" relative orientation, i.e., when the towing vehicle 110 is traveling in a straight line and not turning. In such an orientation, it is relatively easy for a user to position the mower 120 so the mower 120 has minimal overlap with previously cut crop and has no underlap so an edge E of uncut crop is cut by the cutters 122 of the mower 120. However, when the towing vehicle 110 makes a turn, as illustrated in FIGS. 2 and 3, the towing angle $\theta$ changes. Without a corresponding change in the mower angle $\beta$, the mower 120 may not be oriented to efficiently cut the crop material without creating underlap or significant overlap with previously cut crop material.

To address some of the previously described issues, the agricultural mower system 100 includes a controller 160, which may be carried by the towing vehicle 110, that is operably coupled to the towing sensor 140 and the mower sensor 150. The controller 160 is configured to determine the towing angle $\theta$ has changed by a change amount $\phi$ relative to a defined towing angle $\alpha$; determine a turn compensation amount $\gamma$ for the mower angle $\theta$ as a function of the change amount $\phi$ and a constant; and output a compensation signal to cause the mower angle actuator 130 to adjust the mower angle $\theta$ by the determined turn compensation amount $\gamma$. The defined towing angle $\alpha$ may be, for example, the towing angle $\theta$ when the towing centerline TCL and the mower centerline MCL are parallel to one another, as illustrated in FIG. 1, which generally corresponds to straight-line travel of the towing vehicle 110 and the mower 120. When the towing centerline TCL and the mower centerline MCL are parallel to one another, the mower angle $\theta$ is equal to the towing angle $\theta$, as indicated in FIG. 1. In this respect, the controller 160 can determine when the towing vehicle 110 is turning, as indicated by the change in the towing angle $\theta$ relative to the defined towing angle $\alpha$, and cause the mower angle actuator 130 to adjust the mower angle $\beta$ by the turn compensation amount $\gamma$ so the mower 120 continues to cut the edge E of uncut crop as the towing vehicle 110 navigates the radius of the turn.

Referring specifically to FIG. 2, the situation is illustrated in which the towing vehicle 110 is turning opposite to the offset of the mower 120, i.e., the towing vehicle 110 is turning left while the mower 120 is offset to the right. It should be appreciated that an analogous situation would be presented if the mower 120 were offset to the left and the towing vehicle 110 were turning to the right. During such a turn, it can be seen that the towing angle $\theta$ decreases by the change amount $\phi$ relative to the defined towing angle $\alpha$. To compensate for this decrease in the towing angle $\theta$, the controller 160 determines that the turn compensation amount $\gamma$ should be a positive value that is added to the mower angle $\theta$ in order for the mower 120 to steer away from the towing vehicle 110 and follow the larger radius of the uncut crop, which maintains engagement with the edge E of the uncut crop. In other words, the turn compensation amount $\gamma$ may be a positive value when the change amount $\phi$ is a negative value.

The determined turn compensation amount $\gamma$ is based on a function of the change amount $\phi$ as well as a constant. The function of the change amount, which may be defined as $f(\phi)$, may be based on several parameters, including but not limited to a speed of the towing vehicle 110, a turn radius of the towing vehicle 110, a turn radius of the mower 120, etc. Thus, it should be appreciated that the function of the change amount $f(\phi)$ will vary based on parameters of the agricultural mower system 100. The constant may be a constant based at least partially on at least one geometric value of the mower 120. For example, the mower 120 may include a pair of wheels 124 defining a wheel axis WA and the frame 121 may pivot relative to the tongue 123 about a pivot axis PA. The at least one geometric value of the mower 120 on which the constant is based may be a minimum distance D between the wheel axis WA and the pivot axis PA, as illustrated in FIGS. 2-3. Thus, the constant may be based on one or more geometric values of the mower 120 that have an effect on the turn radius of the mower 120 in order for the mower angle $\beta$ to be properly adjusted to compensate for the change in turn radius of the towing vehicle 110. In some embodiments, an absolute value of the turn compensation amount $\gamma$ is equal to the function of the change amount $f(\phi)$ multiplied by the constant, designated as c, i.e., $|\gamma|=f(\phi)*c$.

Referring now to FIG. 3, the situation is illustrated in which the towing vehicle 110 is turning in the same direction as the offset of the mower 120, i.e., the mower 120 is offset on the right and the towing vehicle 110 is turning right. It should be appreciated that an analogous situation arises when the mower 120 is offset on the left and the towing vehicle 110 turns to the left. In such a situation, the towing angle $\theta$ increases compared to the defined towing angle $\alpha$, i.e., the change amount $\phi$ is a positive value. Consequently, the turn compensation amount $\gamma$ for the mower angle $\theta$ is a negative value so the mower 120 follows the turn radius of the uncut crop and stays in engagement with the edge E. Similarly to the situation illustrated in FIG. 2, the turn compensation amount γ for the mower angle θ is a function of the change amount φ and the constant, which may be based on one or more geometric values of the mower 120.

In the scenario where the defined towing angle α is equal to the towing angle θ when the towing centerline TCL is parallel to the mower centerline MCL, in which case the mower angle θ is also equal to the towing angle θ, the value for the mower angle θ may be determined based on the measured towing angle θ. For example, in FIG. 1, there is no change amount φ relative to the defined towing angle α, i.e., φ is equal to zero, so the mower angle θ is equal to the towing angle θ with a function of change amount φ of zero, i.e., the mower angle θ is equal to the towing angle θ. In the subsequent scenarios illustrated in FIGS. 2-3, the mower angle β may be adjusted from the baseline mower angle β, which is equal to the towing angle θ and the defined towing angle α, by the turn compensation amount γ, which is a function of the change amount φ and the constant. It should thus be appreciated that, in some embodiments, the turn compensation amount γ for the mower angle θ can be determined based on the change amount φ of the measured towing angle θ as well as the constant when the towing vehicle 110 is turning from straight-line travel. It should be further appreciated that the controller 160 provided according to the present disclosure can also readily determine the turn compensation amount γ for the mower angle θ in the situation where the towing vehicle 110 makes a turn and then makes another turn before going to straight-line travel, i.e., during a compound turn, to maintain engagement between the mower 120 and the edge E of uncut crop.

In some embodiments, the controller 160 is configured to toggle between a mode where the controller 160 determines the turn compensation amount γ and causes a corresponding adjustment of the mower angle β or not, i.e., the turn compensation may be turned off by a user. In some embodiments, the user may select a button on a display or similar device that causes the controller 160 to enter the turn compensation mode and perform the previously described functions. In some embodiments, the defined towing angle α is a preset angle value that is stored in a memory or elsewhere and is recalled by the controller 160 during operation. In some embodiments, the defined towing angle α is set by the user, either as a direct input or as a value determined by the controller 160. For example, the user may control the towing vehicle 110 so the towing centerline TCL and the mower centerline MCL are parallel to one another in the desired offset relationship. The user may then make a selection on a display (or other device) that the towing vehicle 110 and the mower 120 are in a desired offset relationship. The controller 160 may then request the towing angle signal from the towing sensor 140 to determine the current towing angle θ, which the controller 160 then defines as the defined towing angle α. In some embodiments, the controller 160 also simultaneously requests the mower angle signal from the mower sensor 150 to determine the current mower angle β, which the controller 160 then defines as a base mower angle. It should thus be appreciated that the defined towing angle α may be defined in a variety of ways according to the present disclosure.

In some embodiments, as previously described, the mower angle actuator 130 is a hydraulic cylinder that extends or retracts to adjust the mower angle β. To control the mower angle actuator 130, and thus the mower angle β, the towing vehicle 110 may include a hydraulic fluid system 118 that is coupled to and powers the mower angle actuator 130. The hydraulic fluid system 118 may, for example, couple to a hydraulic coupler on the tongue 123 that couples to the mower angle actuator 130, fluidly coupling the hydraulic fluid system 118 to the mower angle actuator 130. The controller 160 may be operably coupled to the hydraulic fluid system 118 and configured to output the compensation signal to the hydraulic fluid system 118, which may then adjust fluid flow to the mower angle actuator 130 to cause a corresponding extension or retraction and change in the mower angle β. For example, the controller 160 may output a compensation signal to the hydraulic fluid system 118 that causes one or more valves of the hydraulic fluid system 118 to open, increasing the fluid pressure provided to the mower angle actuator 130 and causing a corresponding extension. The extension of the mower angle actuator 130 may cause the mower angle θ to increase, which the controller 160 can monitor via mower angle signals from the mower sensor 150. If the controller 160 determines that the mower angle has not adjusted by the determined turn compensation amount γ, which may be due to unexpectedly high resistance to pivoting of the frame 121, the controller 160 may output a corrective signal to the hydraulic fluid system 118 to further increase the fluid pressure provided to the mower angle actuator 130. In this respect, the controller 160 may be configured to monitor the mower angle θ following outputting the compensation signal to ensure that the mower angle β is adjusted by the determined turn compensation amount γ based on feedback from various inputs.

From the foregoing, it should be appreciated that the controller 160 of the agricultural mower system 100 provided according to the present disclosure can automatically determine the proper turn compensation amount γ for the mower angle θ when the towing angle θ deviates from the defined towing angle α and cause a change in the mower angle θ so the mower 120 stays in proper engagement with an edge E of uncut crop material during a turn. The controller 160 thus reduces the risk of a user misjudging how to maneuver the towing vehicle 110 and the mower 120 to keep the mower 120 in engagement with the edge E of uncut crop material. The controller 160 can also reduce the fatigue a user experiences during operation by alleviating the need for the user to plan and execute complex turn maneuvers in the field.

Figure 4:
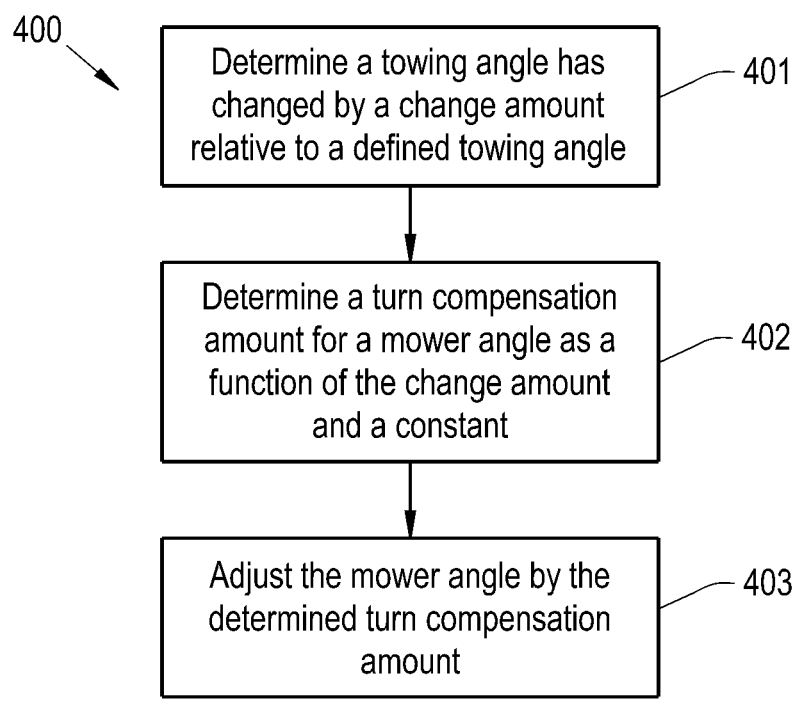
FIG. 4 is a flow chart illustrating an exemplary embodiment of a method of adjusting a mower of an agricultural mower system, provided in accordance with the present disclosure.

Referring now to FIG. 4, an exemplary embodiment of a method 400 for adjusting the mower 120 of the agricultural mower system 100 provided according to the present disclosure is illustrated. The method 400 includes determining 401 the towing angle θ has changed by the change amount φ relative to the defined towing angle α; determining 402 the turn compensation amount γ for the mower angle θ as a function of the change amount φ and the constant; and adjusting 403 the mower angle θ by the determined turn compensation amount γ using the mower angle actuator 130 coupled to the frame 121 and the tongue 123. In some embodiments, adjusting 403 the mower angle θ includes adjusting a fluid flow from the hydraulic fluid system 118 to the mower angle actuator 130, which may be a hydraulic cylinder. The steps 401, 402, 403 of the method 400 may be performed by the previously described controller 160. Further, the method 400 may include steps directed toward any of the previously described functionality of the controller 160 and/or other components of the agricultural mower system 100.

It is to be understood that the steps of the method 400 may be performed by the controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 160 described herein, such as the method 400, is implemented in software code or instructions which are tangibly stored on a tangible computer readable medium. The controller 160 loads the software code or instructions via a direct interface with the computer readable medium or via a wired and/or wireless network. Upon loading and executing such software code or instructions by the controller 160, the controller 160 may perform any of the functionality of the controller 160 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural mower system, comprising:
 a towing vehicle comprising an engine and a tongue coupler, the towing vehicle defining a towing centerline;
 a mower comprising a frame carrying a plurality of cutters and pivotably coupled to a tongue that is pivotably coupled to the tongue coupler, the frame defining a mower centerline that is offset from the towing centerline, the tongue defining a towing angle with respect to the towing centerline and a mower angle with respect to the mower centerline;
 a mower angle actuator coupled to the tongue and the frame and configured to pivot the frame with respect to the tongue to adjust the mower angle;
 a towing sensor associated with the towing vehicle and configured to output a towing angle signal corresponding to the towing angle;
 a mower sensor associated with the frame and configured to output a mower angle signal corresponding to the mower angle; and
 a controller operably coupled to the towing sensor and the mower sensor, the controller being configured to:
  determine the towing angle has changed by a change amount relative to a defined towing angle based on the towing angle signal;
  determine a turn compensation amount for setting the mower angle using the mower angle actuator as a function of the change amount in the towing angle and a constant; and
  output a compensation signal to cause the mower angle actuator to adjust the mower angle by the determined turn compensation amount.

2. The agricultural mower system of claim 1, wherein the defined towing angle is defined as the towing angle when the towing centerline and the mower centerline are parallel to one another.

3. The agricultural mower system of claim 1, wherein the constant is based at least partially on at least one geometric value of the mower.

4. The agricultural mower system of claim 3, wherein the mower comprises a pair of wheels defining a wheel axis and the frame pivots relative to the tongue about a pivot axis, the at least one geometric value comprising a minimum distance between the wheel axis and the pivot axis.

5. The agricultural mower system of claim 1, wherein the turn compensation amount is a positive value when the change amount is a negative value.

6. The agricultural mower system of claim 1, wherein the turn compensation amount is a negative value when the change amount is a positive value.

7. The agricultural mower system of claim 1, wherein an absolute value of the turn compensation amount is equal to the function of the change amount multiplied by the constant.

8. The agricultural mower system of claim 1, wherein the mower angle actuator comprises a hydraulic cylinder.

9. The agricultural mower system of claim 8, wherein the towing vehicle comprises a hydraulic fluid system that is coupled to and powers the hydraulic cylinder, the controller being operably coupled to the hydraulic fluid system and configured to output the compensation signal to the hydraulic fluid system.

10. A method of adjusting a mower of an agricultural mower system, the mower comprising a frame that is pivotably coupled to a tongue pivotably coupled to a tongue coupler of a towing vehicle, the towing vehicle comprising an engine and defining a towing centerline, the mower comprising a plurality of cutters carried by the frame, the frame defining a mower centerline that is offset from the towing centerline, the tongue defining a towing angle with respect to the towing centerline and a mower angle with respect to the mower centerline, the method comprising:
 determining the towing angle has changed by a change amount relative to a defined towing angle based on a towing angle signal from a towing sensor associated with the towing vehicle;
 determining a turn compensation amount for setting the mower angle using a mower angle actuator coupled between the frame and the tongue as a function of the change amount in the towing angle and a constant; and
 adjusting the mower angle by the determined turn compensation amount using the mower angle actuator coupled to the frame and the tongue.

11. The method of claim 10, wherein the defined towing angle is defined as the towing angle when the towing centerline and the mower centerline are parallel to one another.

12. The method of claim 10, wherein the constant is based at least partially on at least one geometric value of the mower.

13. The method of claim 12, wherein the mower comprises a pair of wheels defining a wheel axis and the frame pivots relative to the tongue about a pivot axis, the at least one geometric value comprising a minimum distance between the wheel axis and the pivot axis.

14. The method of claim 10, wherein the turn compensation amount is a positive value when the change amount is a negative value.

15. The method of claim 10, wherein the turn compensation amount is a negative value when the change amount is a positive value.

16. The method of claim 10, wherein an absolute value of the turn compensation amount is equal to the function of the change amount multiplied by the constant.

17. The method of claim 10, wherein the mower angle actuator comprises a hydraulic cylinder.

18. The method of claim 17, wherein the towing vehicle comprises a hydraulic fluid system that is coupled to and powers the hydraulic cylinder, wherein adjusting the mower angle comprises adjusting a fluid flow from the hydraulic fluid system to the hydraulic cylinder.

19. A non-transitory computer-readable storage medium including instructions for adjusting a mower of an agricultural mower system, the mower comprising a frame that is pivotably coupled to a tongue pivotably coupled to a tongue coupler of a towing vehicle, the towing vehicle comprising an engine and defining a towing centerline, the mower comprising a plurality of cutters carried by the frame, the frame defining a mower centerline that is offset from the towing centerline, the tongue defining a towing angle with respect to the towing centerline and a mower angle with respect to the mower centerline, the instructions, when executed by a processor, configure the processor to perform functions comprising:
   determining the towing angle has changed by a change amount relative to a defined towing angle based on a towing angle signal from a towing sensor associated with the towing vehicle;
   determining a turn compensation amount for setting the mower angle using a mower angle actuator coupled between the frame and the tongue as a function of the change amount in the towing angle and a constant; and
   adjusting the mower angle by the determined turn compensation amount using the mower angle actuator.

20. The non-transitory computer-readable storage medium of claim 19, wherein the mower angle actuator comprises a hydraulic cylinder, wherein the towing vehicle comprises a hydraulic fluid system that is coupled to and powers the hydraulic cylinder, and wherein adjusting the mower angle comprises:
   adjusting a fluid flow from the hydraulic fluid system to the hydraulic cylinder.

* * * * *